No. 784,785. PATENTED MAR. 14, 1905.
F. E. GETTS.
SHAFT PACKING.
APPLICATION FILED JULY 25, 1904.

2 SHEETS—SHEET 1.

Witnesses:
Marcus L. Byng.
Helen Orford

Inventor:
Frank E. Getts,
by Albert G. Davis
Att'y.

No. 784,785. PATENTED MAR. 14, 1905.
F. E. GETTS.
SHAFT PACKING.
APPLICATION FILED JULY 25, 1904.

2 SHEETS—SHEET 2.

Witnesses:
Marcus L Byng
Helen Oxford

Inventor:
Frank E. Getts,
by Albert H. Dam
Att'y.

No. 784,785.                                              Patented March 14, 1905.

UNITED STATES PATENT OFFICE.

FRANK ELMER GETTS, OF CHICAGO, ILLINOIS, ASSIGNOR TO GENERAL ELECTRIC COMPANY, A CORPORATION OF NEW YORK.

SHAFT-PACKING.

SPECIFICATION forming part of Letters Patent No. 784,785, dated March 14, 1905.

Application filed July 25, 1904. Serial No. 218,095.

*To all whom it may concern:*

Be it known that I, FRANK ELMER GETTS, a citizen of the United States, residing at Chicago, county of Cook, State of Illinois, have invented certain new and useful Improvements in Shaft-Packings, of which the following is a specification.

This invention relates to packing for rotating shafts—such, for example, as the shafts of elastic-fluid turbine-engines. Its object is to provide a steam and vacuum tight packing which is simple in construction and can be readily repaired, if necessary.

The invention consists in the combination, with a shaft, of a stationary casing having one or more rubbing-surfaces transverse to the axis of the shaft, one or more packing-rings bearing against said surface or surfaces and mounted in a carrier rotating with said shaft, springs for exerting a pressure on the packing ring or rings, and soft packing to insure a tight joint between the rings on the shaft.

Figure 1:
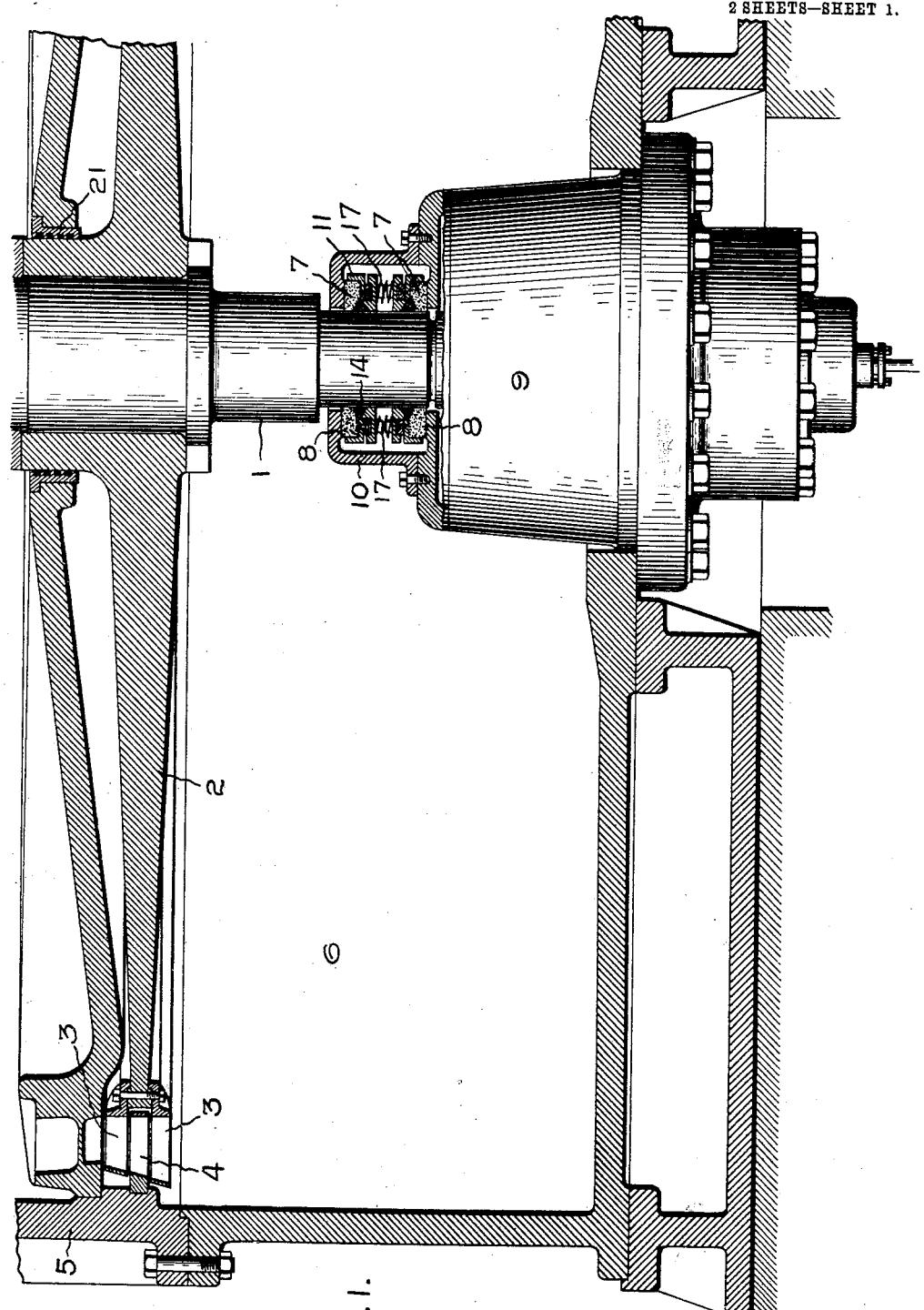
Figure 2:
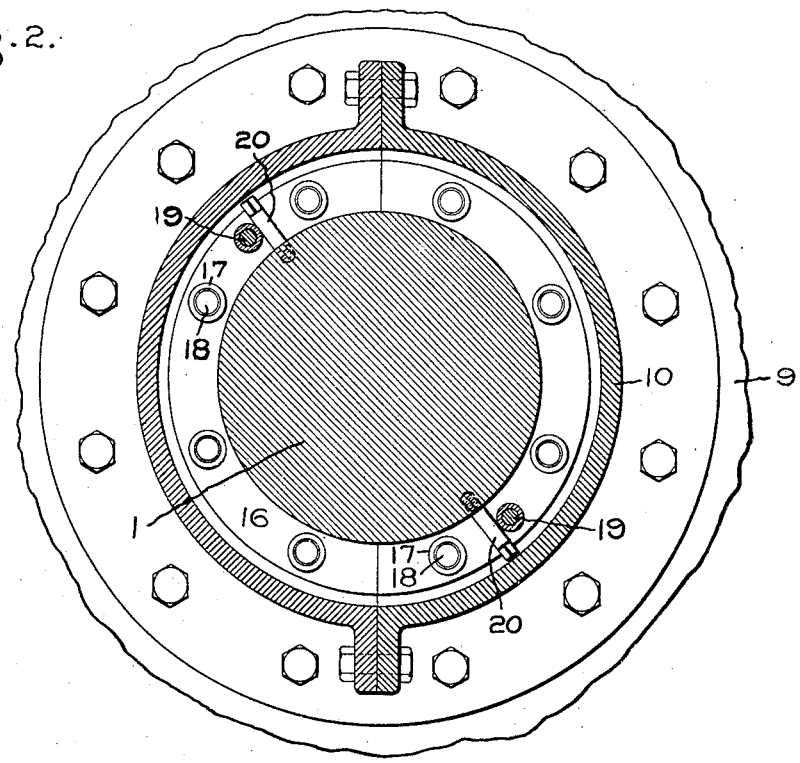
Figure 3:
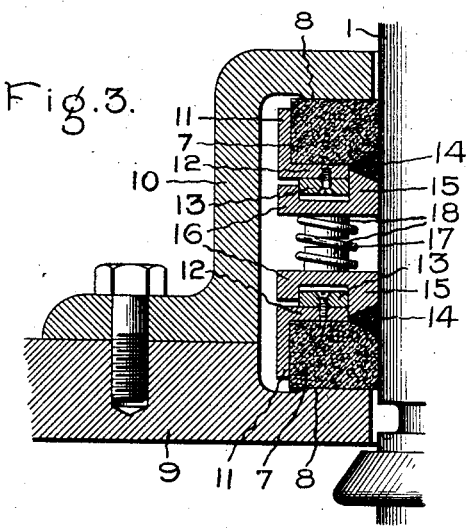
Figure 4:
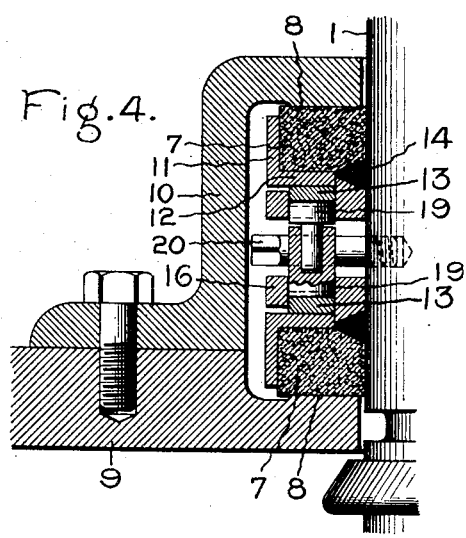

In the accompanying drawings, Figure 1 is a sectional elevation of a portion of a turbine equipped with my improved packing. Fig. 2 is a cross-section on the line 2 2, Fig. 1, and on a large scale. Fig. 3 is a section of the packing radial to the shaft, on a larger scale than Fig. 2; and Fig. 4 is a similar section showing the devices for rotating the packing and its carrier.

The machine selected for illustration is a steam-turbine of the vertical type; but it will be evident that the invention is applicable to horizontal as well as vertical shafts.

Referring to Fig. 1, the shaft 1 carries a bucket-wheel 2, whose buckets 3 coöperate with the stationary intermediates 4 on the casing 5. The exhaust-steam enters the chamber 6, in which a vacuum is maintained by suitable condensing apparatus. (Not shown.) The shaft passes through this chamber and is supported in a bearing of any desired construction. The packing which forms the subject-matter of this application is located inside the chamber 6 at the point where the shaft passes out of it and is designed to maintain the joint tight against the admission of air in order to preserve the vacuum and to prevent the oil which lubricates the shaft-bearing from working into the condenser.

The packing ring or rings 7 may be of any suitable material, but I prefer to use carbon, for the reason set forth in the patent to Dodge, No. 730,349. Each ring surrounds the shaft and has a wearing-surface, preferably in a plane of revolution, bearing against a stationary rubbing surface or seat 8, faced off on the inner side of the casing 9, which carries the shaft-bearing. The drawings show two rings 7, the inner one bearing against a rubbing-surface 8 on a flanged annular collar 10, fastened to the casing 9 concentric with the shaft.

Each packing-ring is made in segments, preferably two in number. These are mounted in an annular carrier, also made in two semicircular segments, having an outer wall 11 and an inwardly-projecting flange 12. The segments are held together by a flat ring 13, composed of two segments fastened to the flange 12 and arranged to break joints therewith. The flange 12 does not extend to the shaft, but leaves an annular space to receive a segmental ring of soft packing 14, arranged to break joints with the carbon packing-ring. The soft packing hugs the shaft closely and has two oppositely-beveled faces, one bearing against a chamfer on the carbon ring and the other against an inclined surface on a flange 15 on a segmental annular follower 16. The flange 15 enters between the shaft and the inner edge of the flange 12 on the ring 13, so that the latter holds the segments of the follower in place with some clearance between the carrier and the follower. Abutting against the follower are a lot of springs 17, which press the flange 15 against the soft packing. By reason of the incline on the flange and the chamfer on the carbon the soft packing is forced tightly against the shaft, so that no leakage can occur between the carbon packing and the shaft. The pressure of the springs is communicated through the soft packing to the carbon packing and holds it against its stationary rubbing surface or seat. In order to keep the springs in place, they are preferably slipped over studs 18 on the follower. When two packing-rings are used, the studs on the two followers are arranged opposite each other, but not touching, so that one spring abuts on both, as shown.

To insure the rotation of the packing-rings with the shaft, each half of the ring 13 has a lug 19 passing through a hole in the follower and engaged by a driver secured to the shaft, preferably a radial pin 20, screwed into the shaft. It is preferred to interlock the lugs on the two rings, as shown in Fig. 4, one having a tongue entering a socket in the other.

In the arrangement shown the inner packing-ring will be held snugly against its seat by the vacuum in the chamber 6 when the space inside the collar 10 is at atmospheric pressure. Should there be a vacuum in said space, then the inner ring, like the outer one, will be kept tight by the springs. This packing may be used between the stages on a multistage turbine, if desired, in place of the packing 21.

In accordance with the provisions of the patent statutes I have described the principle of operation of my invention, together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is—

1. The combination with a rotatable shaft, of a stationary seat adjacent thereto, a packing-ring bearing on said seat, an annular carrier for said ring, and soft packing for the joint between the ring and the shaft.

2. The combination with a rotatable shaft, of a stationary seat adjacent thereto, a packing-ring bearing on said seat, an annular carrier for said ring, soft packing for the joint between the ring and the shaft, and means for compressing said soft packing.

3. The combination with a rotatable shaft, of a stationary seat adjacent thereto, a packing-ring bearing on said seat and having a chamfer next the shaft, soft packing having a beveled face bearing on said chamfer, and a spring-actuated follower pressing against said soft packing.

4. The combination with a rotatable shaft, of a stationary seat adjacent thereto, a packing-ring bearing on said seat and having a chamfer next the shaft, soft packing having beveled faces, one of which bears on said chamfer, and a spring-actuated follower having a beveled flange bearing on the other face of the soft packing.

5. The combination with a rotatable shaft, of a stationary seat adjacent thereto, a packing-ring bearing on said seat, an annular carrier for said ring, a lug projecting from said carrier, and a driver projecting from said shaft and engaging said lug.

6. The combination with a rotatable shaft, of a stationary seat adjacent thereto, a packing-ring bearing on said seat, an annular carrier for said ring having a flange, soft packing in the space between the flange and the shaft, and a follower entering said space and bearing on the packing.

7. The combination with a rotatable shaft, of a stationary seat adjacent thereto, a packing-ring bearing on said seat, an annular carrier for said ring having a flange, soft packing in the space between the flange and the shaft, a follower entering said space and bearing on the packing, a lug on the carrier-flange passing through said follower, and a driver secured to the shaft and engaging with said lug.

8. The combination with a rotatable shaft, of a casing concentric therewith, two opposing stationary seats inside said casing, and packing-rings carried by said shaft and rubbing on said seats.

9. The combination with a rotatable shaft, of two stationary seats opposite to each other and concentric with said shaft, two packing-rings bearing respectively on said seats, carriers for said rings, and springs between said carriers.

10. The combination with a rotatable shaft, of two stationary seats opposite to each other and concentric with said shaft, two packing-rings bearing respectively on said seats, carriers for said rings, soft packing for the joints between the shaft and said rings, followers bearing on said packing, and springs abutting between said followers.

11. The combination with a rotatable shaft, of two stationary seats opposite to each other and concentric with said shaft, two packing-rings bearing respectively on said seats, carriers for said rings, springs between said carriers, interlocking lugs on said carriers, and a radial driver on said shaft engaging with said lugs.

In witness whereof I have hereunto set my hand this 21st day of July, 1904.

FRANK ELMER GETTS.

Witnesses:
FRANK N. BOYER,
C. E. MEYER.